United States Patent [19]

Junqua et al.

[11] Patent Number: 5,799,065
[45] Date of Patent: Aug. 25, 1998

[54] CALL ROUTING DEVICE EMPLOYING CONTINUOUS SPEECH

[75] Inventors: Jean-Claude Junqua; Michael Galler, both of Santa Barbara, Calif.

[73] Assignee: Matsushita Electric Industrial Co., Ltd., Osaka, Japan

[21] Appl. No.: 642,766

[22] Filed: May 6, 1996

[51] Int. Cl.[6] .............................. H04M 1/30; H04M 3/42
[52] U.S. Cl. .............................................. 379/88; 379/216
[58] Field of Search ..................... 379/88, 67, 216, 379/212, 80, 89, 355

[56] References Cited

U.S. PATENT DOCUMENTS

| | | | |
|---|---|---|---|
| 3,928,724 | 12/1975 | Byram et al. | 379/80 X |
| 4,164,025 | 8/1979 | Dubnowski et al. | 379/213 X |
| 4,763,350 | 8/1988 | Immendorfer et al. | 379/67 |
| 5,303,299 | 4/1994 | Hunt et al. | 379/88 |
| 5,572,577 | 11/1996 | Harrila | 379/67 |
| 5,594,784 | 1/1997 | Velius | 379/88 |
| 5,638,425 | 6/1997 | Meador, III et al. | 379/88 |

FOREIGN PATENT DOCUMENTS

| | | | |
|---|---|---|---|
| 62-140593 | 6/1987 | Japan | 379/212 |
| 62-166642 | 7/1987 | Japan | 379/212 |

*Primary Examiner*—Thomas W. Brown
*Attorney, Agent, or Firm*—Harness, Dickey & Pierce, P.L.C.

[57] ABSTRACT

The call routing device plugs into existing extensions of the office telephone network or PBX system and acts as a "virtual" operator, prompting incoming callers to spell the name of the desired recipient. The speech recognizer uses a multipass procedure employing Hidden Markov Models and dynamic programming. The N-best hypotheses are propagated between passes, allowing the more computationally costly routines to be reserved until the final pass, when the size of the search space is significantly reduced. The routing device prompts the user to confirm that the selected name is correct, whereupon the device signals the telephone network to automatically switch the incoming call to the telephone extension of the selected recipient.

10 Claims, 16 Drawing Sheets

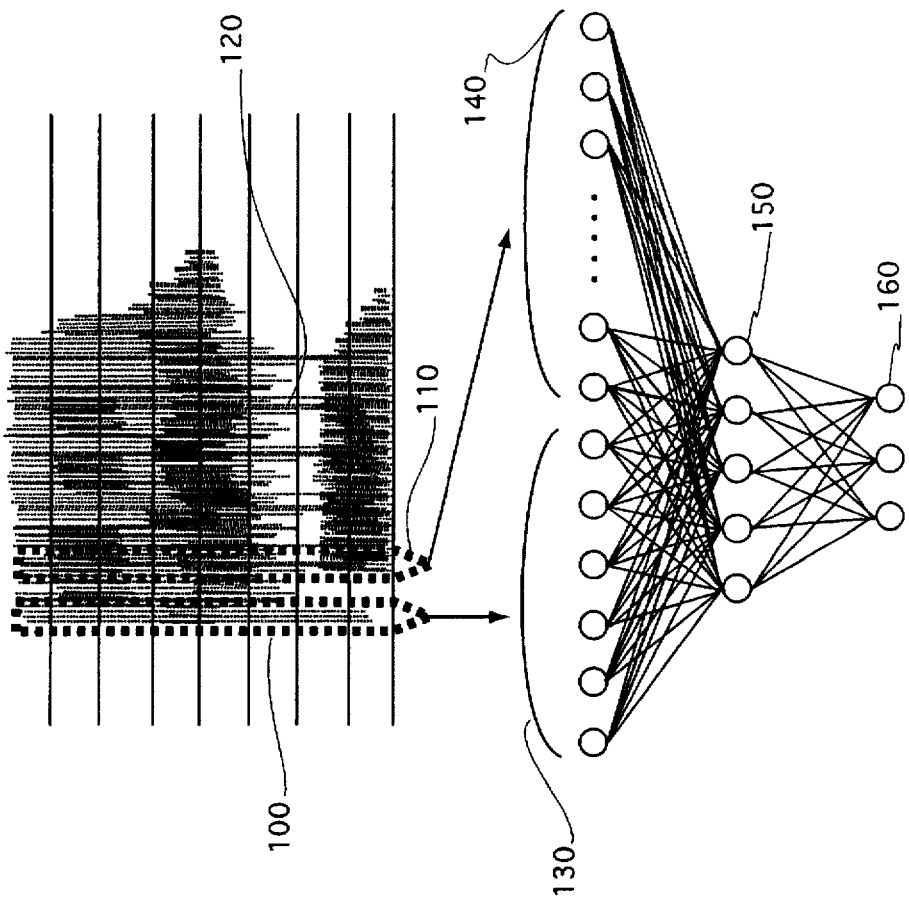
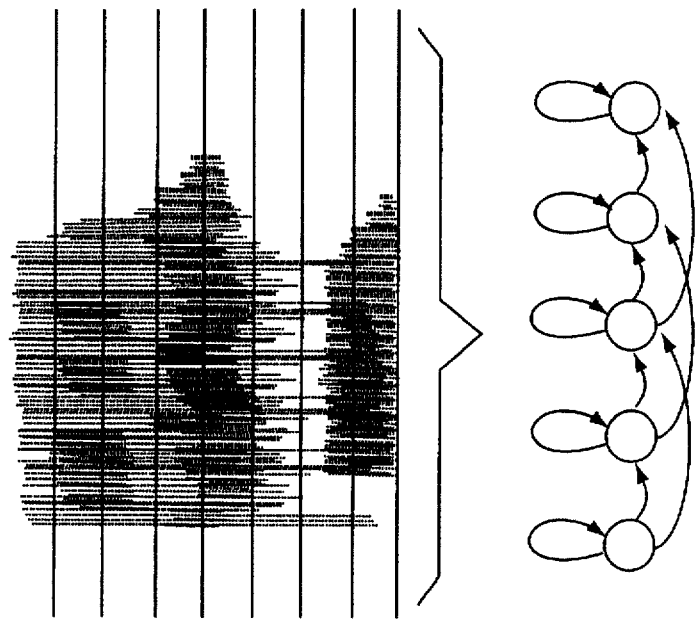
Figure 11B
Figure 11A

CALL ROUTING DEVICE EMPLOYING CONTINUOUS SPEECH

BACKGROUND AND SUMMARY OF THE INVENTION

The present invention relates generally to telephone call routing systems. More particularly, the invention relates to a speech recognizing switching system that may be incorporated in office PBX telephone networks by original design or retrofit. The system recognizes continuously spelled names and other word commands spoken through a telephone handset.

Automated voice mail systems have become a ubiquitous component of the modern-day business environment. Connected to an office PBX network, automated voice mail systems work reasonably well at recording incoming caller's messages when the intended recipient is unable to answer the call. Automated voice mail systems are thus able to lift a great deal of the load from human operators. However, limitations in present-day telephone PBX systems and call routing networks make truly operator-free operation impractical and unattractive.

In a conventional telephone PBX system, the incoming call may be handled by a human operator who learns the identity of the intended recipient and routes the call to that recipient by selecting the proper telephone extension. Alternatively, operator-free systems intercept all incoming calls with a voice mail message that instructs the incoming caller to enter the intended recipient's extension number in order to route the call. Unless the incoming caller uses the system frequently enough to know the intended recipient's telephone extension, the caller must resort to a rather cumbersome telephone extension lookup procedure, using the touchtone buttons on his or her telephone to spell the intended recipient's name. Unfortunately, telephone touchtone keypads were not designed for touch typing. Many find the practice annoying.

The present invention offers a solution. Instead of having to access the telephone extension lookup database by spelling intended recipient's names using the touchtone keypad, the caller simply spells the name by speaking into the telephone handset. The system of the invention includes a sophisticated continuous speech recognizer that is speaker-independent, allowing most persons to spell the intended recipient's name in their own accent and at their own natural speaking rate. The system converts the spelled name into a series of hypotheses corresponding to the most likely candidates on the phone extension list. The recognizer propagates the N-best hypotheses through a multipass procedure, applying computationally intensive operations in the final pass only if needed, to select the spelled name from the phone extension list.

The system then speaks the selected candidate's name back to the caller, utilizing either a prerecorded message or speech synthesizer module, asking the caller whether the party identified is the correct one. The caller may then simply say "yes" or "no," or other utterances of similar effect, and the system will then connect the incoming caller to the selected extension or allow the incoming caller to spell a different name.

The presently preferred implementation is plug-compatible with existing office telephone network and PBX systems. It will work side-by-side any existing voice system, integrating its functions with those of the existing telephone network. The call routing device of the invention is easy to retrofit into an existing system to add user-friendly operator-free capability.

BRIEF DESCRIPTION OF THE DRAWINGS

FIG. 11A and 11B (collectively FIG. 11) are spectrograms comparing the whole word global method of HMM recognition (FIG. 11A) with the discriminative part neural network recognition (FIG. 11B);

DESCRIPTION OF THE PREFERRED EMBODIMENT

System Overview and Basic Operation

Figure 1:
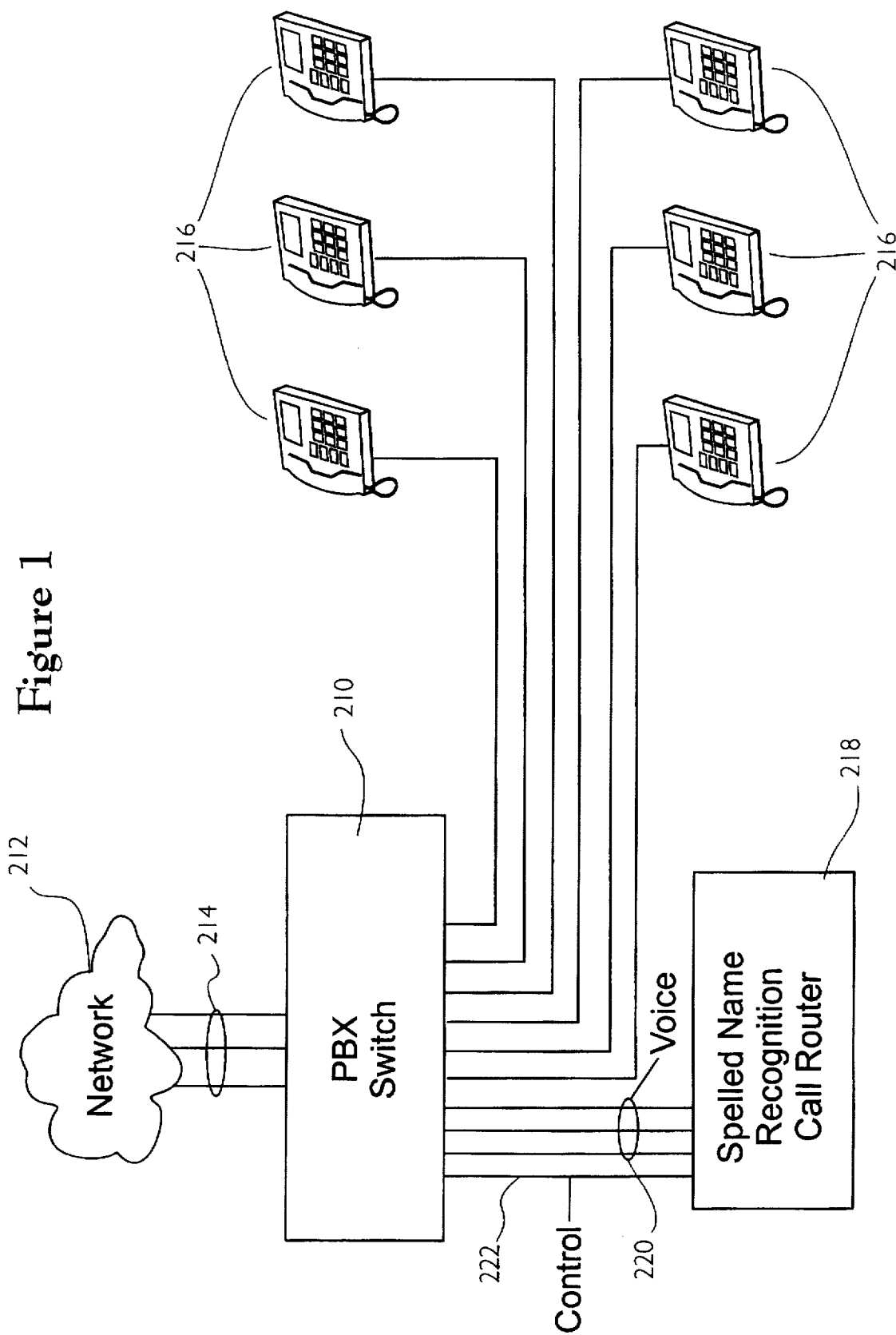
FIG. 1 is a block diagram of an exemplary system using the call routing device of the invention.

The call routing device employing continuous speech recognition will be illustrated in an exemplary embodiment, suitable for plug-and-play connection to an existing PBX switch. Of course, the invention can readily be incorporated in the PBX equipment at the time of its original manufacture, as well. Referring to FIG. 1, the PBX switch 210 is connected to the telephone network infrastructure 212 by conventional means such as telephone lines 214. In the illustrated embodiment three lines have been illustrated for convenience. This is not intended as a limitation of the invention as the invention is capable of being deployed in systems having a greater or fewer number of telephone lines.

The PBX switch is of conventional design, capable of routing incoming calls from network 212 to any of the selected telephone devices such as handsets 216. The spelled name recognition call router 218 of the invention is connected, as the handsets 216 are connected, to additional extensions or ports on the PBX switch 210. As will be more fully discussed, the presently preferred embodiment connects to the PBX switch through a plurality of lines 220 that carry voice traffic and through an additional line 222 that carries the control logic signals that allow the call router to work integrally with the existing PBX system.

Figure 2:
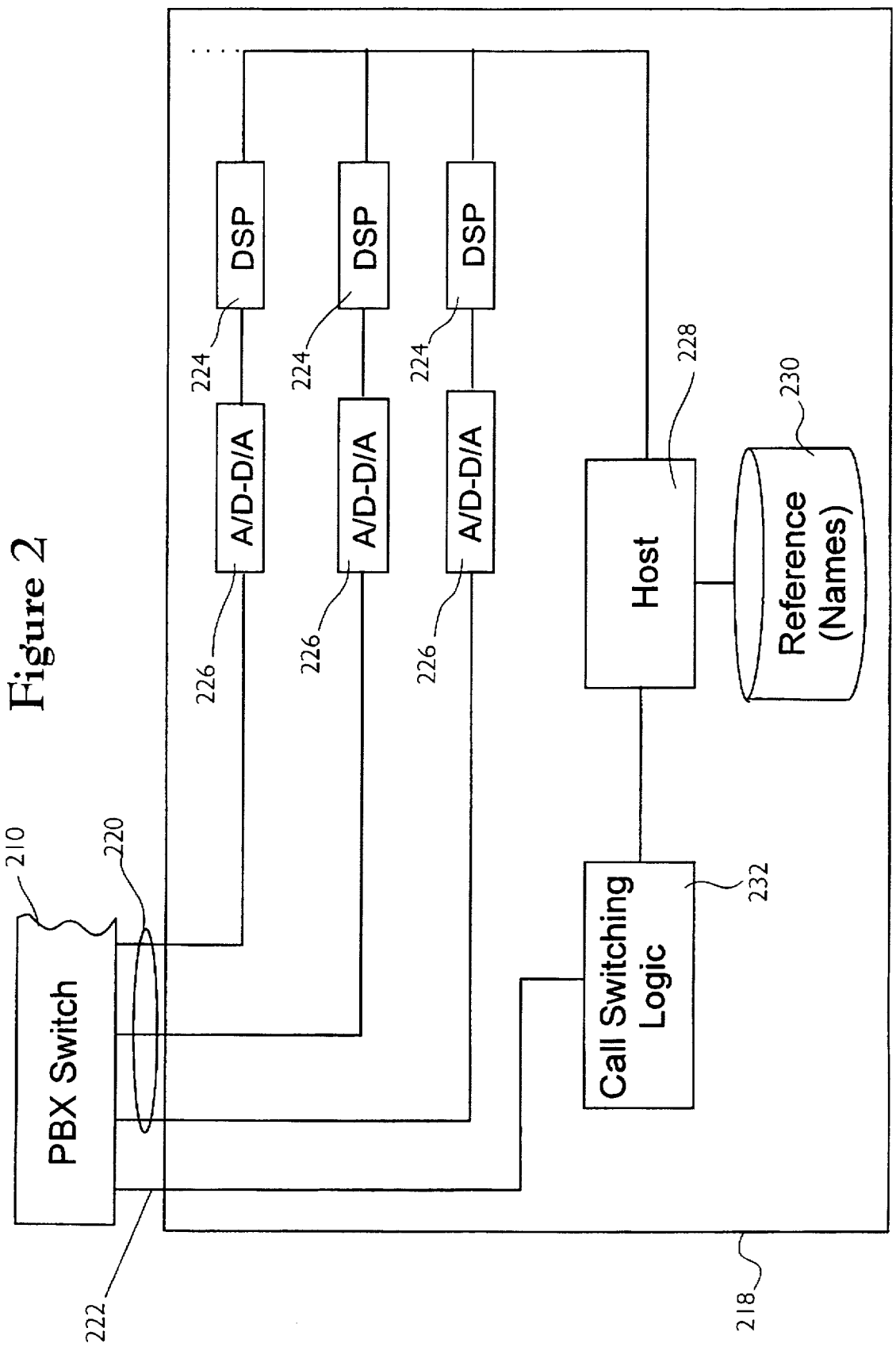
FIG. 2 is a block diagram of an exemplary embodiment of the call routing device of the invention.

FIG. 2 shows the call router 218 in greater detail. PBX switch 210 and lines 220 and 222 have also been illustrated. The call router 218 can be configured in a variety of different ways, depending on the architecture of the PBX system. In the illustrated embodiment the call router has three separate audio channels connected respectively to the three lines 220. Of course, the number of channels required will depend on the architecture of the telephone system. Three channels have been illustrated here to illustrate how a system may simultaneously provide spelled name recognition for three callers on each of the three incoming telephone lines 214. To support additional callers additional audio channels may be included or multiplexing circuitry may be included to allow channels to be shared.

Each of the audio channels has a digital signal processor (DSP) 224 and associated analog-to-digital/digital-to-analog conversion circuitry 226. The digital signal processors are coupled to the host processor 228 that includes a data store 230 in which all references or names are stored. Data store 230 may be any suitable digital storage medium such as random access memory. Data store 230 stores the continuous speech recognition dictionary of all names that can be recognized by the system, with the associated telephone exchange numbers. As will be explained more fully below, the preferred embodiment uses a special speech recognizer that is optimized for speaker-independent recognition of continuously spelled names.

Also coupled to host processor 228 (or incorporated as part of the host processor) is the call switching logic 232. This switching logic connects to the signal line 222 and communicates with the PBX switching system, following the communication protocols dictated by the PBX switch.

Before proceeding with a detailed explanation of the speech recognizer, a brief explanation of the operation of the call router 218 may be helpful. Referring to FIGS. 1 and 2, when an incoming call reaches the PBX switch through one of the telephone lines 214, it may be handled by a human operator without intervention by the call router of the invention. However, if the human operator is not able to handle the call (for example, the call comes in after normal business hours when there is no human operator), the PBX switch is programmed to forward the call to the call router 218. The switch does this by simply assigning the call to one of the audio channels of the call router (to one of the lines 220), based on switching instructions sent on line 222. If desired, the PBX switch can be programmed to jump to a different signal line on a different audio channel within the router 218 if the first line is busy. Having done this, the incoming call is now in communication with a selected one of the DSP processors 224. The processor supplies any required voice prompts to the incoming caller (requesting the caller to spell the name of the desired person) and it also processes the caller's spelled name response. The details of the speech recognition algorithm used by DSP processors 224 will be described below.

As part of the recognition process, the DSP processor 224 downloads from the host 228 a copy of the shared speech recognition resources, namely the data reflecting all reference names and their associated telephone extension numbers. Using an N-best strategy for real-time recognition the DSP-implemented speech recognizer selects the most probable candidate from data store 230. The name of this candidate is spoken back to the caller using the DSP processor to supply a speech synthesized signal or to playback a prerecorded audio signal rendition of the selected person's name. The caller is then asked to respond "yes" or "no," indicating whether the candidate is the correct one. If it is, the host processor 228 uses the call switching logic 232 to instruct the PBX switch to transfer the call from one of the lines 220 to a selected one of the handsets 216. After this switching has occurred, the call router's audio channel is once again free to handle a new incoming call.

Voice Activation Detection

The voice recognition system employed by the call router must be able to handle a wide range of different speech rates. To mimic a natural dialog with the incoming caller, the speech recognizer should respond with the chosen name hypothesis after the caller has paused for a sufficient period to indicate that the spelled name is now complete. This is not as simple as it might first appear, as slowly spelled names may be misconstrued. Long pauses between slowly spelled letters could be misconstrued as the end of name.

Figure 3:
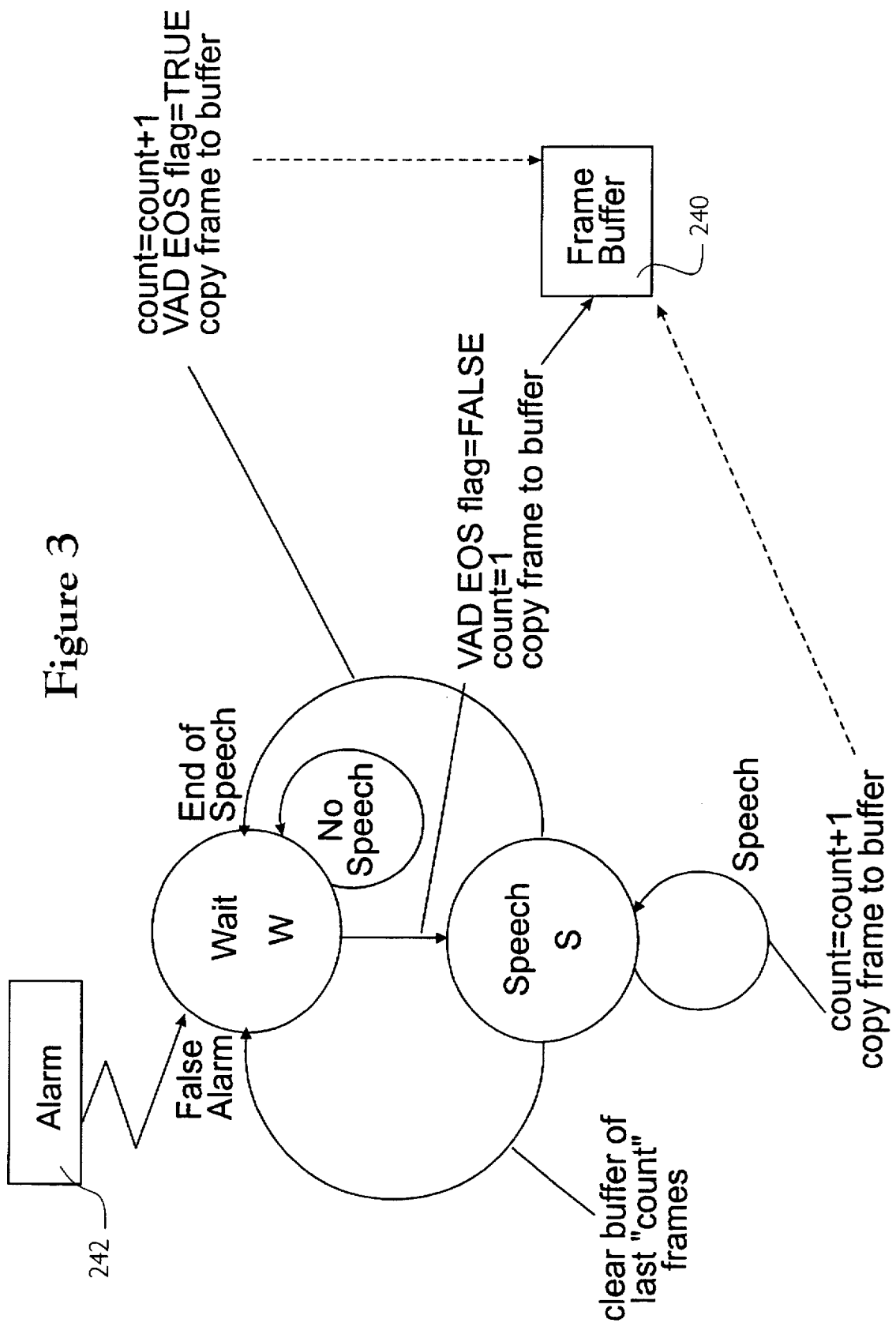
FIG. 3 is a state diagram describing the voice activation detection service routine.

To handle this the present system employs a unique voice activation detection service routine illustrated in FIG. 3. In FIG. 3 the voice activation detection service routine begins in wait state W, a mode that waits for incoming speech. As long as no speech is detected the routine remains in the W state.

Once speech is detected the routine switches to the speech state S, indicating that the beginning of speech has been detected and that speech should be processed. While in this state the principal function is to service the incoming speech by copying a sample of it to a storage buffer depicted at 240. The storage buffer serves as a temporary storage location for the speech signals before they are processed by the speech recognizer.

Figure 4:
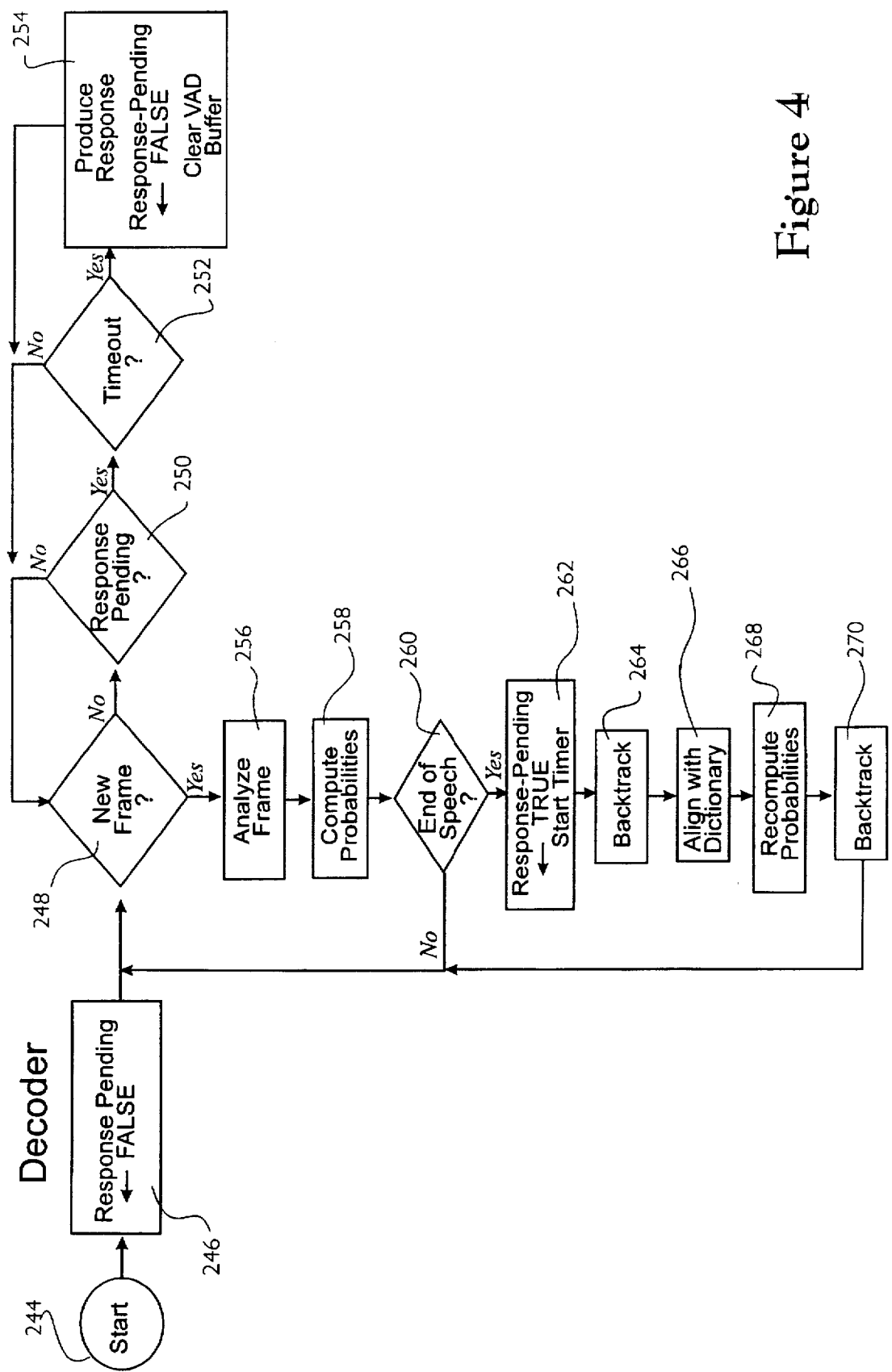
FIG. 4 is a flowchart diagram of the presently preferred decoder.

Upon entry into speech state S, the voice activation detection (VAD) routine sets an end-of-speech flag to FALSE and sets a frame counter index to 1. The end-of-speech flag is used to communicate with the decoder routine that is illustrated in FIG. 4 and described below. The frame count value stores the number of frames that have been copied to the frame buffer 240 since the previous VAD end-of-speech.

In the speech state S each succeeding frame of speech is processed and copied to frame buffer 240, with the frame count value being incremented with each frame copied. If no speech is present over a predetermined time interval, the end-of-speech is declared. The end-of-speech flag is set to TRUE and the voice activation detection routine cycles back to the wait state W. In addition, the current frame (end-of-speech frame) is copied to frame buffer 240.

Should a spurious signal or momentary line noise constituting a false alarm be detected while in speech state S, the voice activation detection routine will immediately return to the wait state W. The routine further responds to a false alarm detection by clearing the last "count" frames from the VAD buffer.

The voice activation detection routine goes to sleep after executing each state transition or loop, while saving the state for resumption of processing when awakened. A periodically-triggered wake-up alarm 242 communicates with the voice activation detection routine to cause the routine to resume processing after going to sleep. The presently preferred embodiment uses a wake-up alarm every 10 milliseconds. Thus the voice activation detection routine is able to periodically monitor the incoming signal, if any, to determine whether there is any speech input that should be copied to buffer 240.

Speech Decoder

The speech recognizer of the preferred embodiment employs a decoder routine that performs speech recognition while accounting for the possibility that a false or premature end-of-speech flag may be set when the caller speaks slowly or pauses unduly between letters. FIG. 4 shows the presently preferred decoder routine and illustrates how the routine handles premature detection of the end-of-speech. Beginning at 244 and proceeding to step 246 the decoder routine initializes a "response-pending" flag to FALSE. This flag is used to make decisions on whether the end-of-speech can be confirmed. In this regard, recall that the voice activation detection routine fills buffer 240 with the speech to be processed, together with an "end-of-speech" flag indicating whether the end-of-speech has been detected by the voice activation routine. The decoder routine employs a separate "response-pending" flag to ensure against false or premature end-of-speech detection by the voice activation routine.

The speech recognition begins at Step 248 by examining buffer 240 to determine whether the buffer contains a new frame of speech information to be processed. As will be explained more fully below, the speech recognizer receives speech that has been separated into frames and these frames are then processed frame-by-frame. If all frames in the buffer have been processed, then control branches to Step 250. If an unprocessed frame remains in the buffer, then control branches to Step 256.

Following the latter branch first, Step 256 analyzes the frame according to the speech recognition procedure described below and in Step 258 the probabilities are computed. The computation of probability is performed by a Viterbi forward algorithm. Next, at Step 260, if the end-of-speech flag was not set (by the VAD routine), control loops back to Step 248 where the next frame is processed.

Finally, when the end-of-speech flag is detected at Step 260 the response-pending flag is set to TRUE and a long silence timer is started at Step 262. This timer is tested at 252 discussed below. The long silence timer is used to ensure that if any speech resumes after the end-of-speech was detected, the system will automatically resume processing the additional frames. It will do this without discarding any parameters previously generated during the recognition processing.

The recognition processing proceeds at Step 264 to perform a backtracking routine upon the probability data generated at Step 258. As will be more fully explained, the backtracking routine prioritizes the N-best hypotheses using the probabilities generated in Step 258.

Next, the hypotheses are aligned with the dictionary of references or names in data store 230. This step is indicated in FIG. 4 at 266. The presently preferred embodiment uses a dynamic programming (DP) algorithm at this step.

If the number of candidates is more than one, the procedure performs an additional pass through the recognizer comprising a recomputation of forward probabilities at Step 268 and backtracking at 270. However, unlike the earlier probability computation and backtracking Steps 258 and 264, the final pass is performed only on the N-best candidates resulting from the dictionary alignment Step 266. Because Steps 268 and 270 involve a much smaller recognition problem (limited to only those N-best candidates selected by previous processing) a more computationally costly, higher accuracy recognition process can be employed. The process proceeds until no frames remain in the buffer.

Step 250 tests the response-pending flag and then passes control to Step 252 which tests the long silence timer initiated in Step 262. In this way Step 252 determines whether a sufficient time has elapsed to ensure that the true end-of-speech has occurred. If so, then a response is generated at 254, supplying the recognized name back to the caller for verification and the VAD buffer is cleared. If not, then the decoder waits for new frames to process.

Details of Preferred Speech Recognition Processing

The presently preferred speech recognition may be viewed as a multipass procedure, with the final pass being used only if the preceding (alignment) pass does not produce a single recognized name as output. The first and final passes employ Hidden Markov Model recognition while the alignment pass employs dynamic programming alignment with the dictionary. In FIG. 4 previously discussed, Steps 258 and 264 comprise the first Hidden Markov Model recognition pass; Step 266 comprises the dynamic programming alignment pass; and Steps 268 and 270 comprise the Hidden Markov Model recognition final pass.

Figure 5:
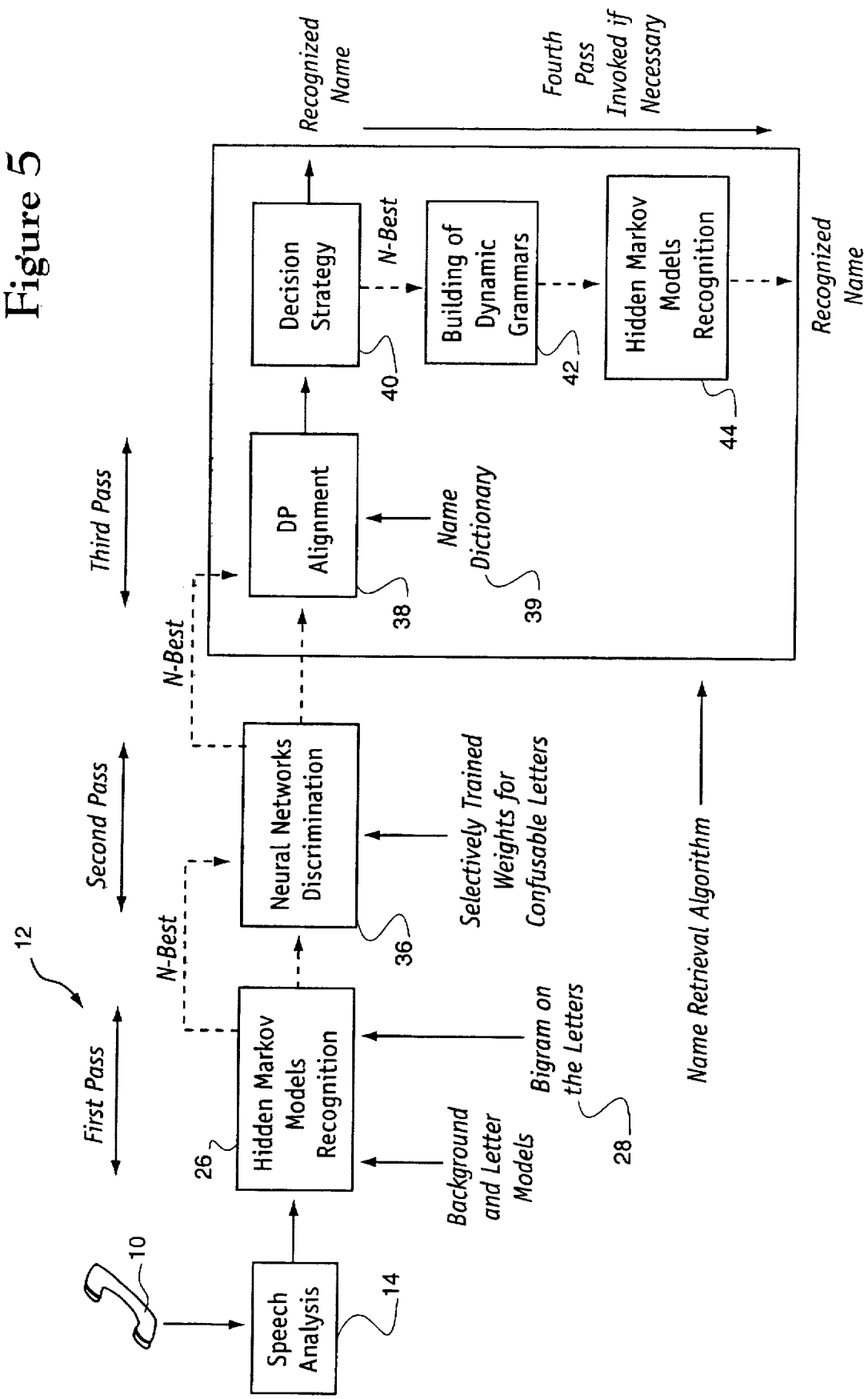
FIG. 5 is a detailed block diagram of the presently preferred recognition system of the invention.

Now referring to FIG. 5, continuously spelled names comprising a sequence of letters are supplied to the recognition system as input through the incoming caller's telephone handset 10. In FIG. 5 the recognition system is depicted generally at 12.

Figure 6:
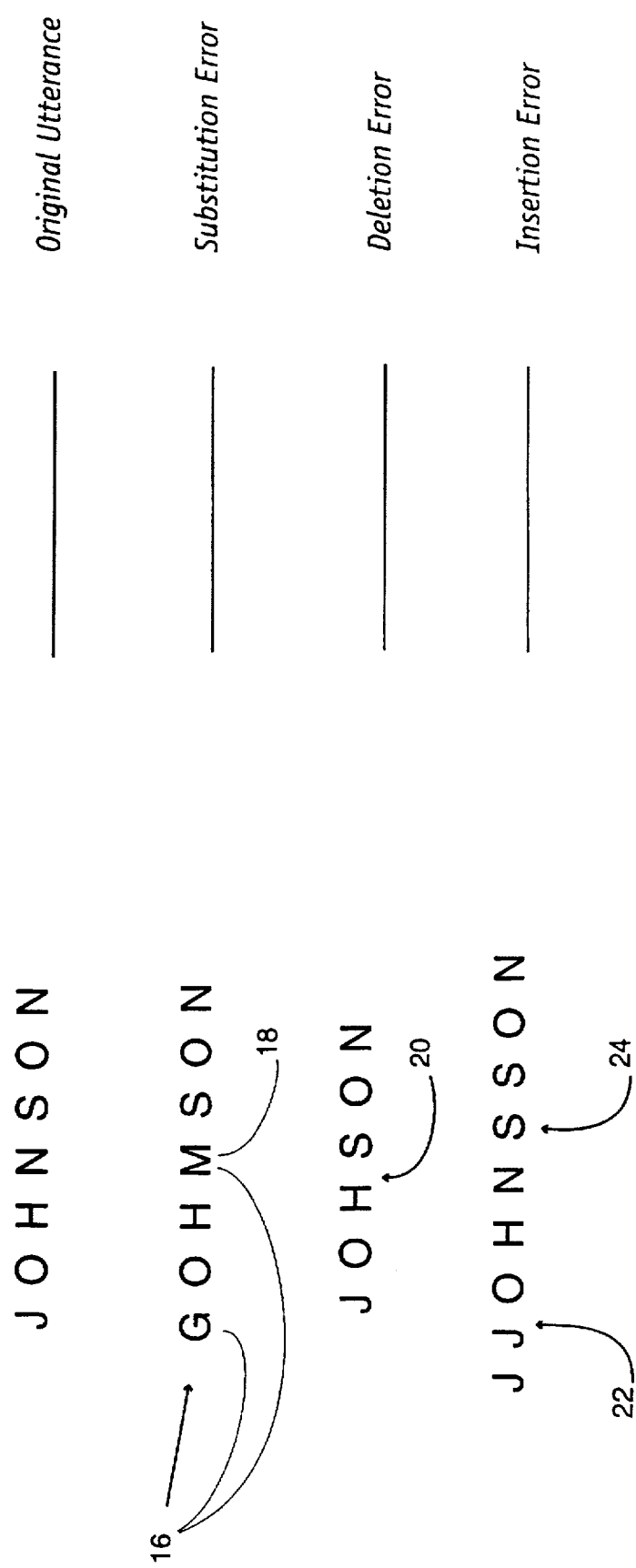
FIG. 6 is a diagram illustrating different types of recognition errors.

The recognition system comprises a collection of processing modules that will now be described. Receiving the input sequence of letters is the speech analysis module 14. This module performs front end optimization designed to decrease the number of substitution, deletion and insertion errors. In a continuously spelled name a substitution error is the substitution of an incorrect letter for the correct one. FIG. 6 illustrates at 16 and 18 examples of substitution errors made in the recognition of the spelled name JOHNSON. A deletion error is the omission of one or more letters from the continuously spelled name. This is illustrated at 20 in FIG. 6. An insertion error is the inclusion of additional letters not originally uttered in the continuously spelled name. An example of an insertion error is shown at 22 and 24 in FIG. 6.

The speech analysis module 14 is designed to operate on digitized speech data. Thus if an analog speech input system is used, the analog signal should first be digitized. This may be done by suitable analog-to-digital circuitry that may be included in the speech analysis module 14.

The presently preferred speech analysis module uses an 8th-order PLP-RASTA process to compensate for the effect of the communication channel. For more information regarding the PLP-RASTA compensation, see H. Hermansky, N. Morgan, A. Bayya and P. Kohn, EUROSPEECH '91, pages 1367–1370, 1991. The presently preferred embodiment uses a 10 millisecond frame shift and a 20 millisecond analysis window. The RASTA filter coefficient is optimized to decrease the number of substitution, deletion and insertion errors. The best filter coefficient compromise is selected for a value of 0.90.

Figure 7:
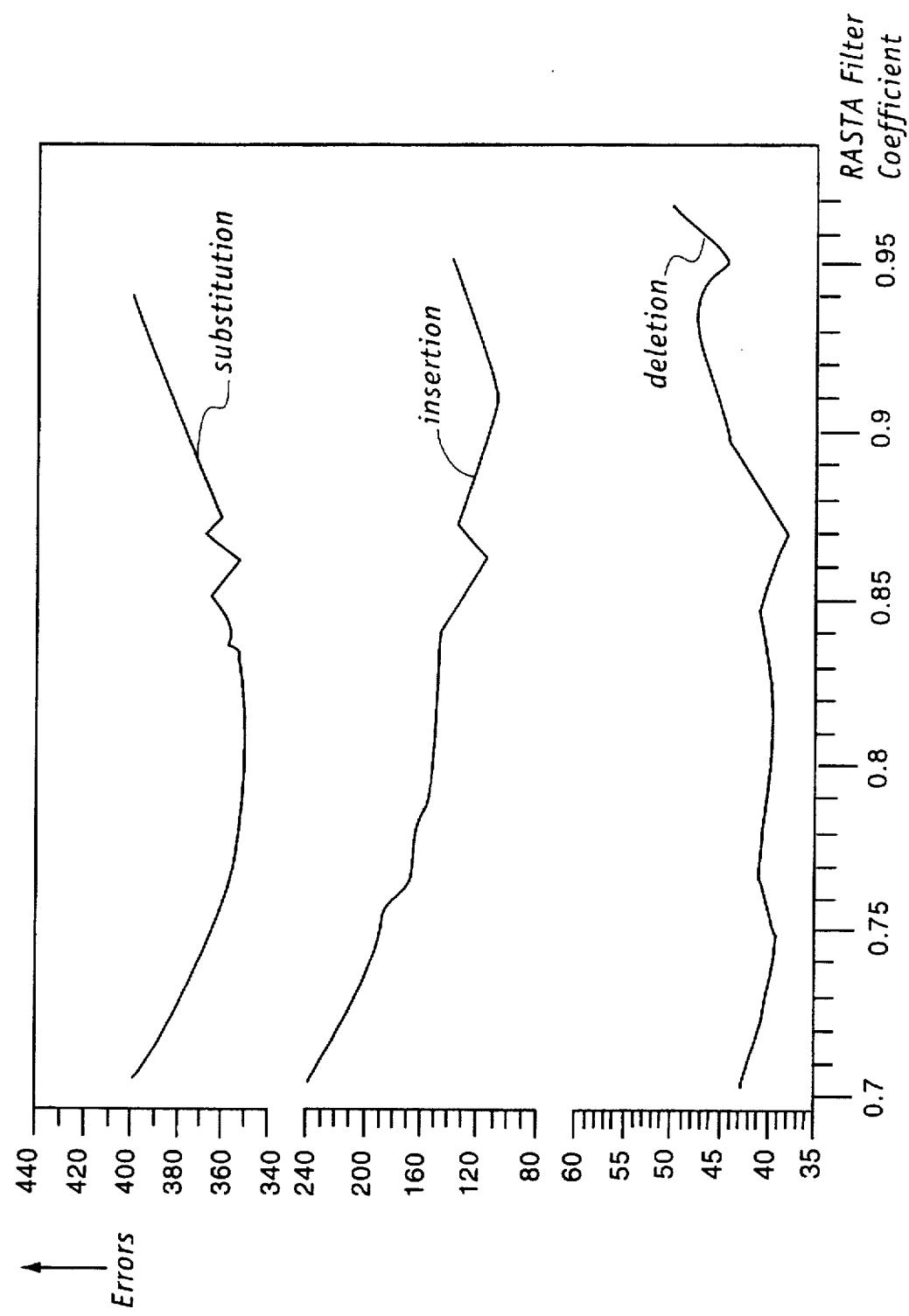
FIG. 7 is a graph showing optimization of the PLP-RASTA filter coefficients to decrease the number of substitution, deletion and insertion errors.

In determining the optimized RASTA filter coefficients, the energy, the first derivative of the energy and the first derivative of the static cepstral coefficients $C_1$ through $C_8$ (computed over 7 frames) are alternatively combined with the static cepstral coefficients to form the speech parametric representation (a total of 18 coefficients). FIG. 7 illustrates the optimized RASTA filter coefficients that will decrease the number of substitution, deletion and insertion errors. In this figure PLP-RASTA stands for the combination of energy, the first derivative of energy, static cepstral coefficients and first derivative of static cepstral coefficients.

While the PLP-RASTA optimization is presently preferred, other forms of optimization may also be used. For example, a mel frequency cepstrum coefficient (MFCC) analysis may alternatively be used. Suitable results can be obtained using a 14th-order MFCC analysis. For the MFCC analysis, 11 static cepstral coefficients ($C_0$ included) are computed with a frame shift of 16 milliseconds and an analysis window of 32 milliseconds.

Different recognition accuracy may be obtained using different feature sets. These feature sets may include static features and dynamic features separately and combined. To illustrate the robustness of the parameterization used in the invention, clean as well as filtered data were used. To obtain filtered data for the test set in the presently preferred embodiment, a distorting filter is used and the test data is filtered to artificially create a mismatch between the training set and the test set. In this regard, see H. Murveit, J. Butzberger and M. Weintraub, DARPA *Workshop Speech and Natural Language*, pages 280–284, February 1992.

Figure 8:
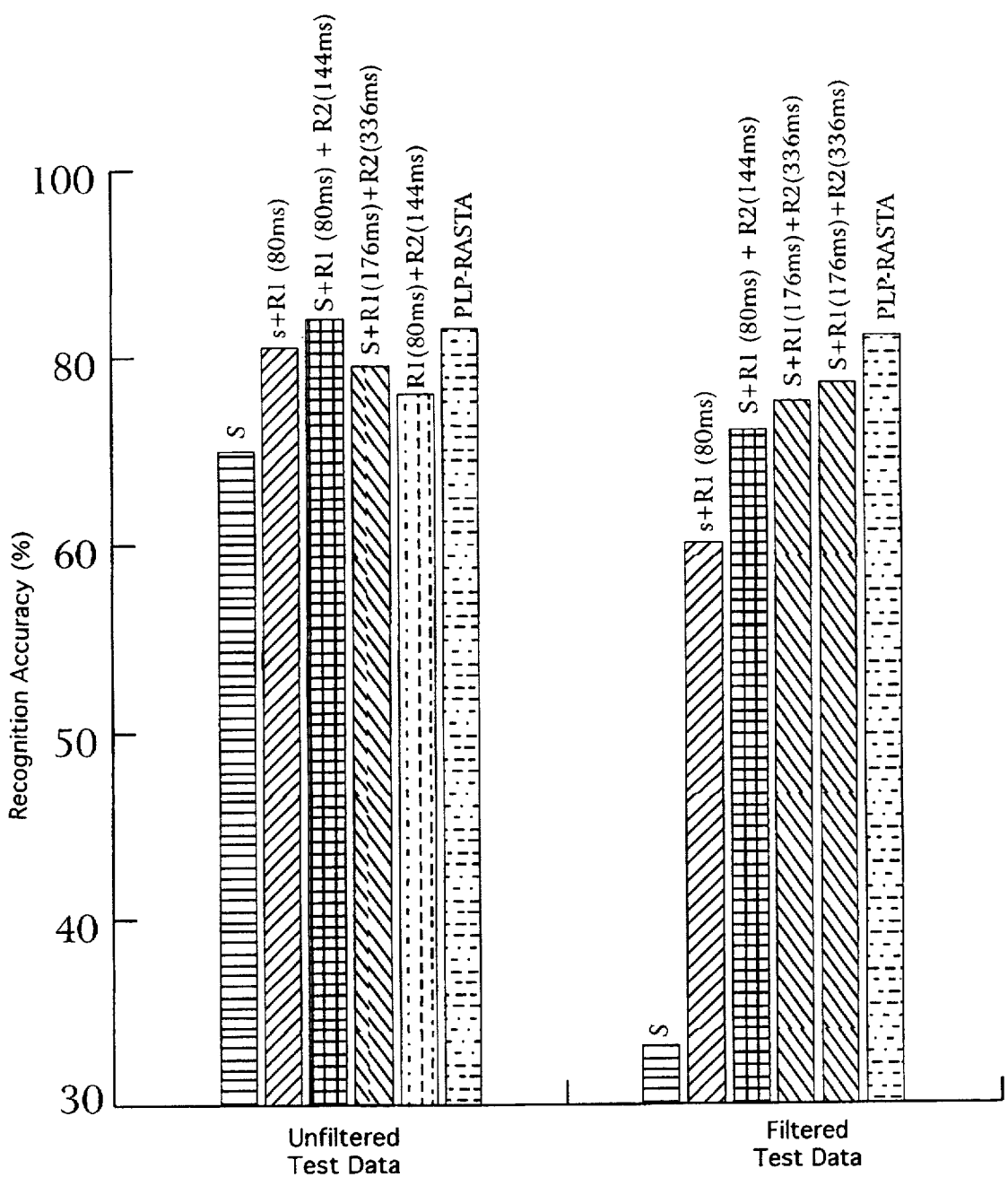
FIG. 8 is a bar graph comparing recognition accuracy obtained using different feature sets.

FIG. 8 compares the recognition accuracy obtained with different feature sets for both unfiltered test data and filtered test data. In FIG. 8 the symbol S stands for static coefficients and the symbols R1 and R2 stand for the 1st-order and 2nd-order regression coefficients, respectively. The data of FIG. 8 show that including a second derivative does slightly improve recognition accuracy for unfiltered speech. The data also show that both PLP-RASTA and the combination of MFCC first and second derivatives (R1+R2) successfully handle the mismatch between training and testing; however, R1+R2, alone, decreases the recognition accuracy for the unfiltered data. The data also show that static coefficients, by themselves, are not robust against a mismatch between training and testing conditions. Finally, long regression windows for the first and second derivatives decrease the recognition accuracy (for our database the average letter duration is 386 milliseconds [ms]). Additional experiments for other window sizes confirm this observation (e.g. R1 [112 ms] and R2 [208 ms]). This result is in agreement with C. Nadeu and B-H. Juang in ICSLP '94, pages 1927–1930, 1994. Long regression windows may not be desirable for continuous speech recognitions systems.

One advantage of the PLP-RASTA process adopted by the presently preferred embodiment is that the bandpass filtering included in PLP-RASTA explicitly compensates for channel distortion. However, we believe that some kind of multistyle training (multienvironment training) is happening because of the diversity and the size of our database. In the case of MFCC analysis, multistyle training also compensates for the channel distortions. Because the present invention is intended principally for real time implementation, the combination of long term cepstral subtraction with MFCC analysis has not been included, although this could improve accuracy. A short term cepstral subtraction may constitute an alternative.

Returning to FIG. 5, connected to speech analysis module 14 is a loosely constrained speech recognizer 26. The speech recognizer works in conjunction with a predefined letter grammar that may be suitably stored in a database. The presently preferred letter grammar is a stochastic grammar, namely bigram letter grammar 28. The invention can be practiced using other letter grammars, such as a trigram grammar or larger. In general, letter grammar 28 may be considered an n-gram letter grammar, where n is an integer greater than 1.

The bigram letter grammar is essentially a database of pairs of letters and an associated probability that one letter follows another. By way of example, the letters J and O have a higher probability of following one another (e.g. JOHNSON) than the letters J and X. The letter grammar is computed on the training set labels and is used by the speech recognizer in decoding the spoken utterances into letter hypotheses.

The presently preferred speech recognizer 26 is a frame synchronous, 1st-order, continuous density, Hidden Markov Model recognizer. The recognizer employs a Viterbi decoder.

The presently preferred embodiment employs a modified Viterbi decoder that yields the N-best hypotheses (instead of a single hypothesis). Usually the Viterbi decoder is designed to provide only the best hypothesis, based on probability of a match between HMM models and the test utterance. This standard Viterbi decoder is modified for use in the invention so that it provides the N-best hypotheses, based on the highest probabilities of a match between HMM models and the test utterance. The symbol N may be any integer greater than 1. The precise value chosen for integer N may depend on the speed of the processor and on the memory size. The presently preferred embodiment uses a value of 20 for N.

Figure 9:
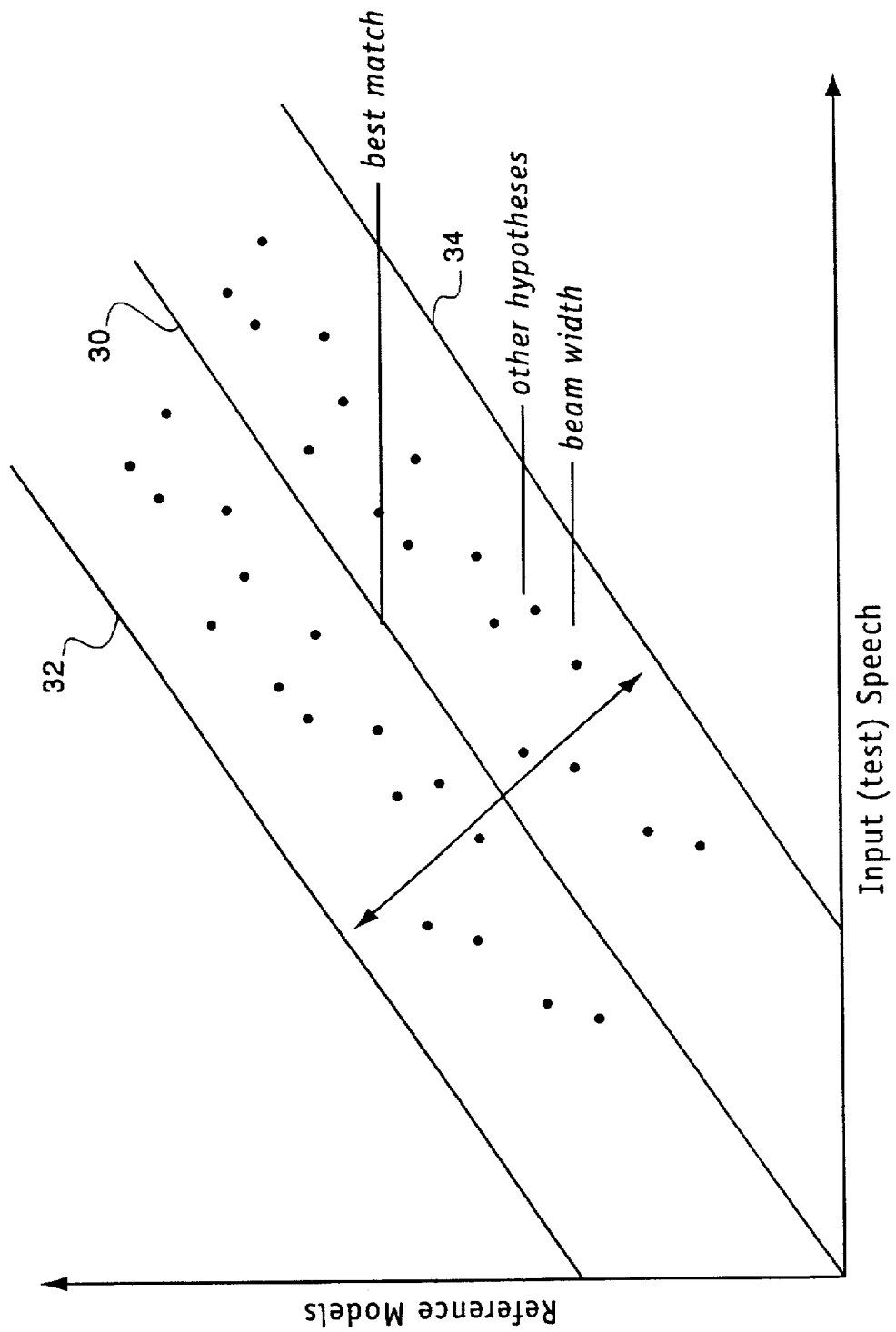
FIG. 9 is a graph depicting the beam search principle employed by the Hidden Markov Model recognizer.

The Hidden Markov Model recognizer employed at 26 is provided with a beam search capability designed to limit the search space, so that the recognizer will process the incoming speech more quickly. To illustrate the beam search principle, refer to FIG. 9. FIG. 9 illustrates the search space examined by the decoder when comparing the input speech (test data) with the reference speech or reference template. In FIG. 9 the input speech is plotted along the i axis and the reference speech is plotted along the j axis. The Hidden Markov Model recognizer produces a score that represents the likelihood of a match between input speech and reference speech. Without the beam search mechanism, the recognizer must keep and compute all the matching possibilities between the test utterance and the HMM models. With beam search the recognizer considers only those scores that deviate from the best score no more than an amount equal to the beam width.

Rather than searching the entire search space, a beam search is implemented whereby the least likely search paths are pruned, such that only the best hypotheses are returned. In FIG. 9 the beam search is constrained between lines 32 and 34.

The N-best candidates are chosen using an N-best algorithm. For details regarding this technique, see R. Schwartz and Steve Austin, "Efficient, High Performance Algorithms for N-Best Search," DARPA Workshop on Speech Recognition, pp. 6–11, 1990. In speech recognition, the incoming speech data is broken up into time frames and analyzed on a frame-by-frame basis. For any given utterance, there may be several possible hypotheses. The presently preferred N-best algorithm selects the best starting time for a letter based only on the preceding letter and not on letters before the preceding letter. As each letter is spoken and analyzed, the Hidden Markov Model recognizer will generate probability scores for each of the models. Because the objective of the system is ultimately to select the most probable sequence of letters, the system stores a plurality of paths, representing possible spelled combinations of letters. To make the system work better as a real time recognizer, two different levels of data pruning are implemented. The pruning technique at both levels involves comparing the probability of a given hypothesis to a probability threshold. If the probability of a given path is below the threshold, it is discarded. More specifically, pruning occurs at a local level and at a global level. Local level pruning involves discarding those paths that represent low probability matches on the letter level; and global pruning involves discarding those paths that represent low probability matches from the beginning of the utterance to the last letter found. Thus, at the end of the spelled name, a recursive traceback is performed to extract the N-best name hypotheses. When the traceback operation is performed, the local and global pruning has already reduced the size of the memory space that needs to be analyzed.

In addition to local and global pruning, the presently preferred system also uses an adaptive threshold whereby the pruning threshold is adjusted dynamically as the system runs. The adaptive threshold adjustment is illustrated in FIG. 10.

Figure 10:
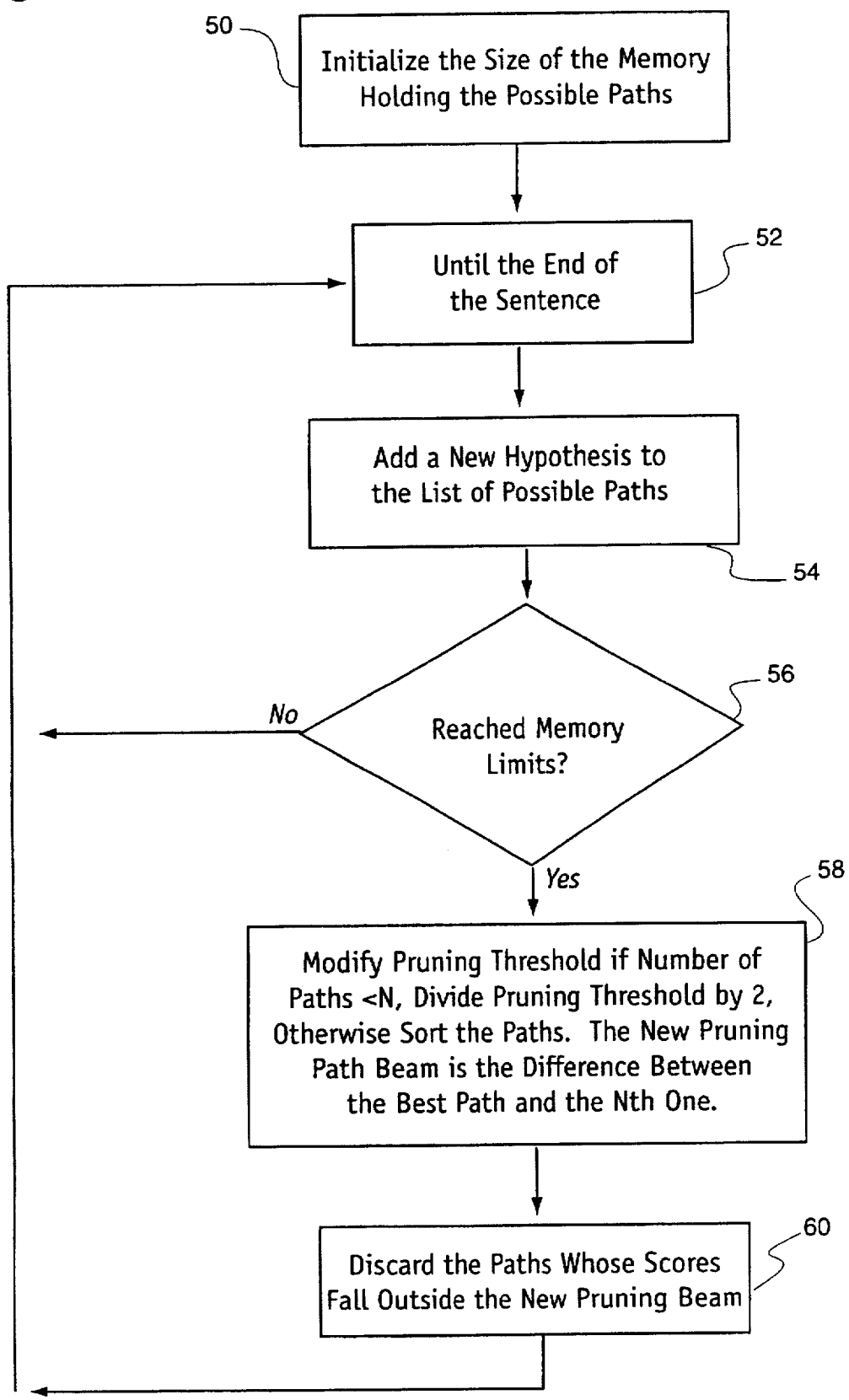
FIG. 10 is a flowchart showing the adaptive path pruning process used in the preferred embodiment.

FIG. 10 shows the preferred adaptive path pruning procedure implemented by the present system. Referring to FIG. 10, at Step 50 the procedure initializes the size of memory that will hold the possible paths that may be followed by the recognizer as it searches the search space. Until the end of the sentence or input utterance is reached (Step 52) a new hypothesis is added to the list of possible paths (Step 54). This procedure repeats until the memory limit is reached at Step 56. Once the memory limit is reached, the pruning threshold is modified. If the number of paths is less than N (the N-best integer) the pruning threshold is divided by 2. Otherwise, the paths are sorted and a new pruning path beam is established as the difference between the best path and the Nth one. Thereafter (Step 60) paths whose scores fall outside the new pruning beam are discarded. The beam search is implemented to eliminate from consideration those hypotheses that fall outside the region of the beam delimited by lines 32 and 34. This decreases the number of paths that must be processed by the decoder, making the recognizer operate more efficiently. If desired, the path pruning threshold can be made adaptive, altering the threshold based on the results of each match attempt. In addition, a local word pruning technique is used that eliminates theories whose last letter probability does not score well as compared to the best last letter probability.

In the case of confusable words, the recognizer uses state tying to help focus on the discriminative part of the word and to decrease the number of estimated parameters. The tied letters are (m, n), (i, r), (p, t) and (b, d). In the presently preferred embodiment all letters except the letter W are represented by a six state HMM model. The letter W is represented by a twelve state HMM model and the silence model is represented by one state. Letter models have different numbers of Gaussian densities, depending on how confusable the letters are. The "E-set" letters: b, c, d, e, g, p, t, v and z, as well as the letters m, n, s and f are all modeled with 6 Gaussian densities. The remaining letters are modeled with three Gaussian densities.

If desired, the system may also include a neural network discriminator to refine the output of the speech recognizer. In FIG. 5 a neural network discriminator 36 is connected to the output of recognizer 26. In the alternative the neural network discriminator may be alternately attached, or additionally attached to the highly constrained recognizer 44. The highly constrained recognizer is discussed more fully below.

The function of neural network discriminator 36 is to distinguish between confusable letters (such as the letters J and K). The neural network is applied to confusable subsets. The first pass of the HMM recognizer produces a sequence of letters (one sequence for each of the N-best). If one of these letters belongs to a confusable subset, the neural network discriminator is launched on the segment between the beginning and ending boundaries for this letter—as given by the HMM recognizer on its first pass. (See Appendix A for example). The neural network discriminator first measures the energy in each utterance to find the maximum energy. The maximum energy corresponds to the vowel part of each letter. Then, the neural network discriminator focuses on data that precedes or follows (in time) the vowel portion of each utterance. It is in these regions that fricatives, affricates, plosives and nasals are produced that provide the primary distinguishing features between confusable letters. In the presently preferred embodiment two frames of cepstral coefficients are extracted from these regions and concatenated. The concatenated coefficients are then used as inputs to the neural network.

The neural network is selectively trained, providing weights for different confusable letters. Thus, when each of the N-best hypotheses are presented to the neural network discriminator, the discriminator examines each, based on nonvowel coefficients. The neural network discriminator, itself, produces an output comprising the N-best hypotheses, based on the highest probabilities of match using the neural network weights to discriminate between confusable letters. The neural network discriminator is only applied on the confusable subsets (e.g. the letters M and N).

To better understand the neural network discriminator, refer first to FIGS. 11A and 11B. In FIG. 11A the global method of analyzing the utterance using a Hidden Markov Model is illustrated. By way of comparison, FIG. 11B shows the neural network disciminator technique. In FIG. 11B, two frames 100 and 110 are identified as representing the data that precedes or follows the vowel portion of the utterance. In this case, the data precedes the vowel portion 120 and the cepstral coefficients of these two frames 100 and 110 are then assigned as inputs to the neural network, as illustrated. In FIG. 11B, the neural network inputs are depicted at 130 and 140. The hidden layer of the neural network is depicted at 150 and the output at 160. The neural network trains on this data to provide improved recognition accuracy for the confusable letters.

Figure 12:
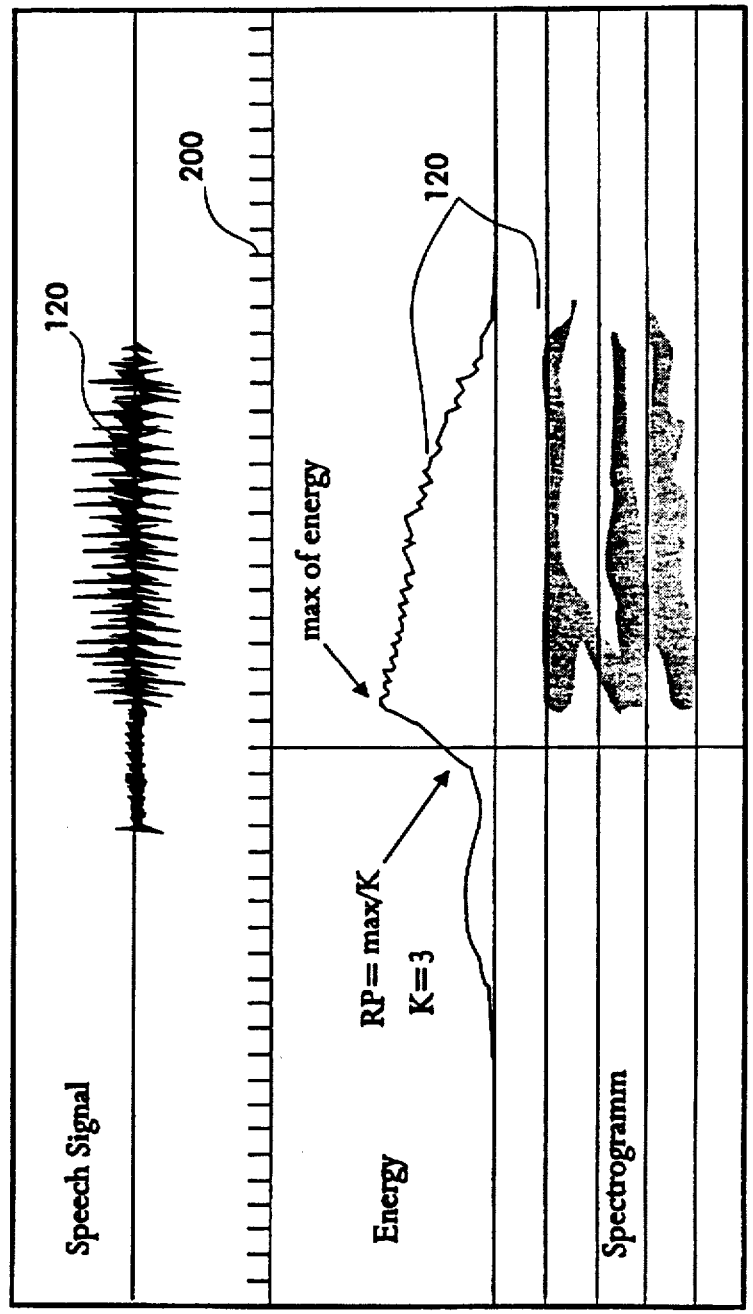
FIG. 12 is a chart showing the speech signal, energy and spectrogram for an example utterance, illustrating the discriminative analyzing technique.
Figure 13:
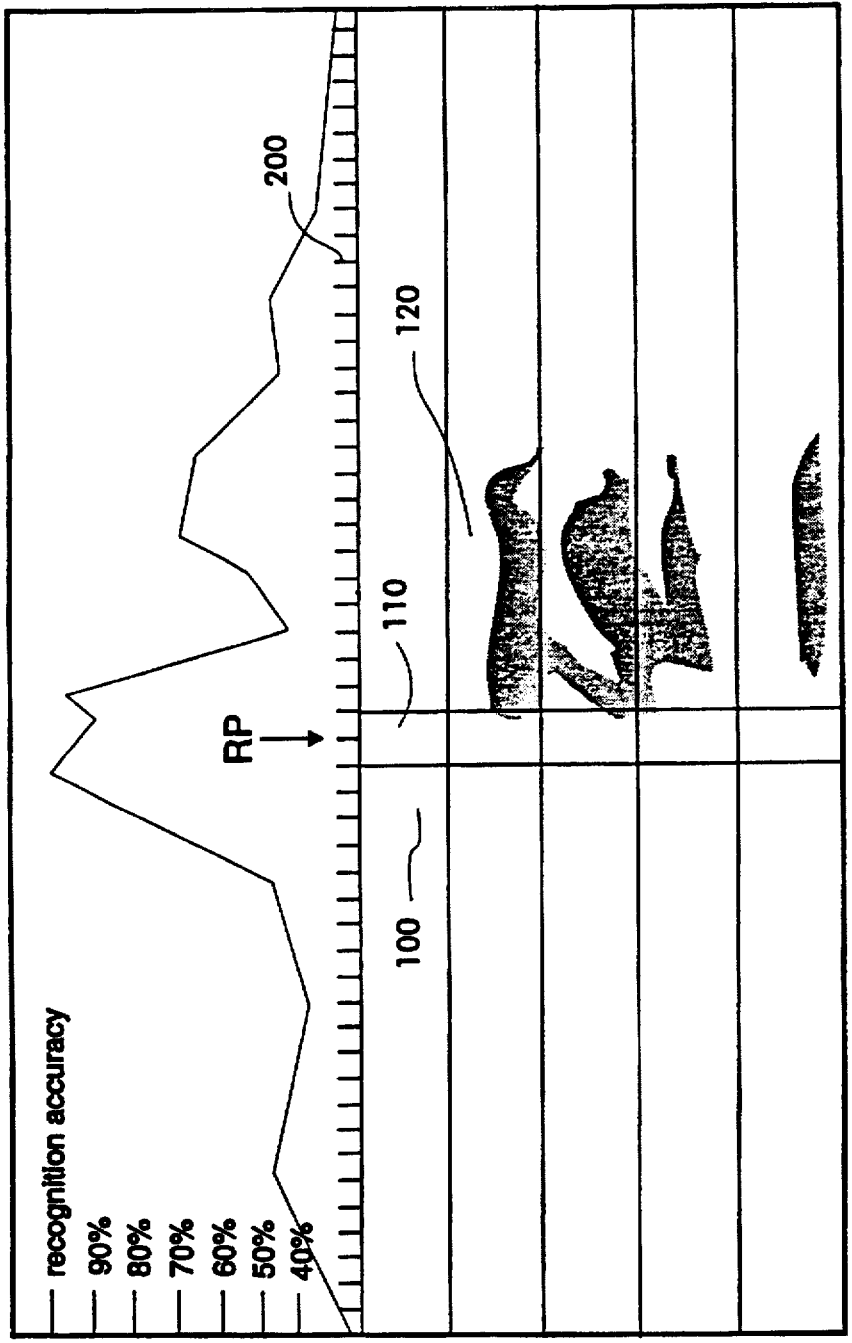
FIG. 13 is a graph showing the selection of two frames for the [A,J,K] subset (frames left and right of the reference point RP)

FIG. 12 shows how the speech signal changes in energy content from time frame to time frame. In FIG. 12, the time frames have been illustrated at 200. FIG. 12 also includes a spectrogram of the speech signal for comparison purposes. Illustrating that the recognition accuracy may be significantly improved by focusing on the region that precedes or follows the vowel portion of the utterance, see FIG. 13. In FIG. 13 two frames for the [A, J, K] subset are illustrated, one frame preceding and one frame following reference point RP. Note that recognition accuracy is quite high in the regions that precede the vowel portion 120.

The N-best hypotheses resulting from the recognizer 26 (or from the neural network discriminator 36, if used) are then passed to dynamic programming (DP) alignment module 38. The dynamic programming alignment module has an associated name dictionary 39 against which the N-best hypotheses are compared. Dynamic programming is used to account for insertion, substitution and deletion errors.

In some instances, the result of dynamic programming alignment will produce a single name with no other candidates. Decision strategy module 40 detects this and provides the recognized name as the output, when there is only one candidate resulting from the DP alignment. In most cases, however, a single candidate does not result, in which case the decision strategy module passes the N-best hypotheses to module 42 for building a dynamic grammar.

Module 42 builds a grammar using the N-best candidates provided by the DP alignment module. The highly constrained recognizer 44 is then invoked to evaluate the N-best candidates using the dynamic grammar 42. The recognizer 44 may also be a Hidden Markov Model recognizer. Even though highly constrained, the data pass through this recognizer is not time-consuming because the dynamic grammar is small and because the parametric representation (computed in 14) need not be recomputed. As noted above, if desired, the neural network discriminator can be applied at the output of recognizer 44.

Figure 14:
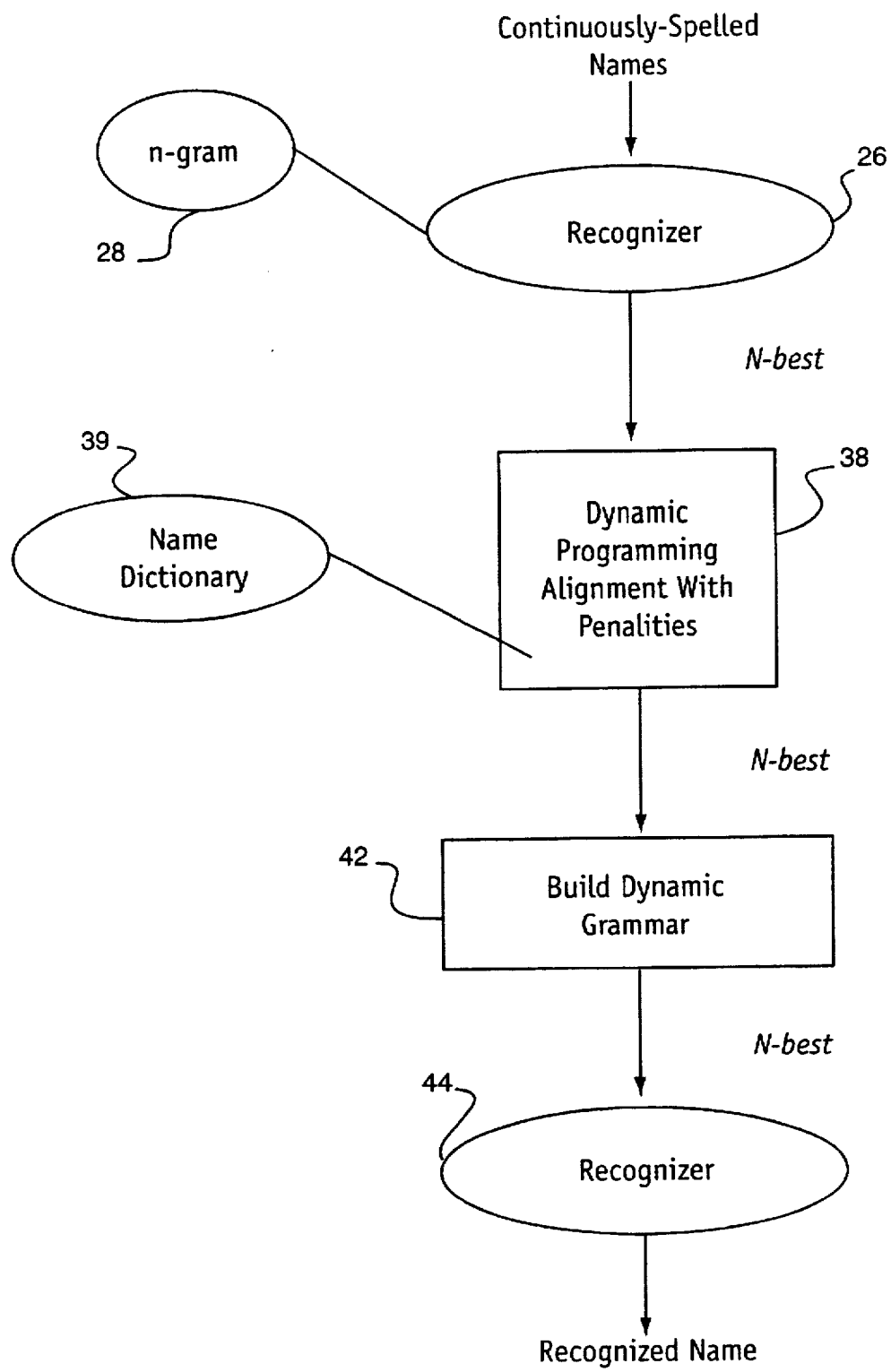
FIG. 14 is a data flow diagram illustrating how the invention propagates the N-best hypothesis through several processing steps.

By way of summary, FIG. 14 shows the manner in which continuously spelled names may be recognized in real-time by propagating the N-best hypotheses through several processing stages. The continuously spelled names are input to the recognizer 26, which applies a loosely constrained recognizing process using the n-gram letter grammar 28. Recognizer 26 picks out the N-best hypotheses and passes these to the dynamic programming (DP) alignment process 38. The alignment process compares the N-best hypotheses with the name dictionary 39, selecting the N-best hypotheses.

The N-best hypotheses selected by the DP module are then used in process 42 to build a dynamic grammar and the N-best hypotheses are then supplied to highly constrained recognizer 44 along with the dynamic grammar 42. The highly constrained recognizer then selects one of the N-best hypotheses (the best one) as the recognized name. If desired, neural network discrimination can be performed on the N-best hypotheses produced by either or both of the recognizers, recognizer 26 and recognizer 44. While these two recognizers have been separately illustrated in FIG. 6 to better show the data flow, a working implementation may require only a single recognizer that is simply used twice during the processing (once to provide the function of recognizer 26 and a second time to perform the function of recognizer 44).

Table I shows the results obtained using the system of the invention. In the Table, different dictionary sizes are listed.

TABLE I

| Size of Dictionary | Average Confusability | Name Recognition Rates After Alignment 38 | Name Recognition Rates After Recognizer 44 |
|---|---|---|---|
| 491 | 0.07 | 97.0% | 98.4% |
| 3,388 | 0.5 | 90.6% | 95.3% |
| 21,877 | 1.8 | 87.0% | 90.4% |

In the above Table the average Confusability index is the number of names that differ by only one letter, averaged for the entire dictionary.

The listing in the Appendix A shows how the system of the invention performs in recognizing the spelled name JOHNSON. In the listing the section designated [First Pass] shows two hypotheses, (1): CKOHAHON and (2): CKO-HASON. Neither of these is the name JOHNSON.

In the section labeled [DP Alignment] the top 10 candidates have been listed and included in the list is the name JOHNSON (candidate 7 of 10). Note that some of the other names achieved higher scores than the name JOHNSON in this pass.

In the section labeled [Costly Constrained Pass] the input utterance is compared with only the candidate selected during DP Alignment and in this case, the recognizer correctly detects the name JOHNSON.

Improved Lattice N-Best Processing

Figure 15:
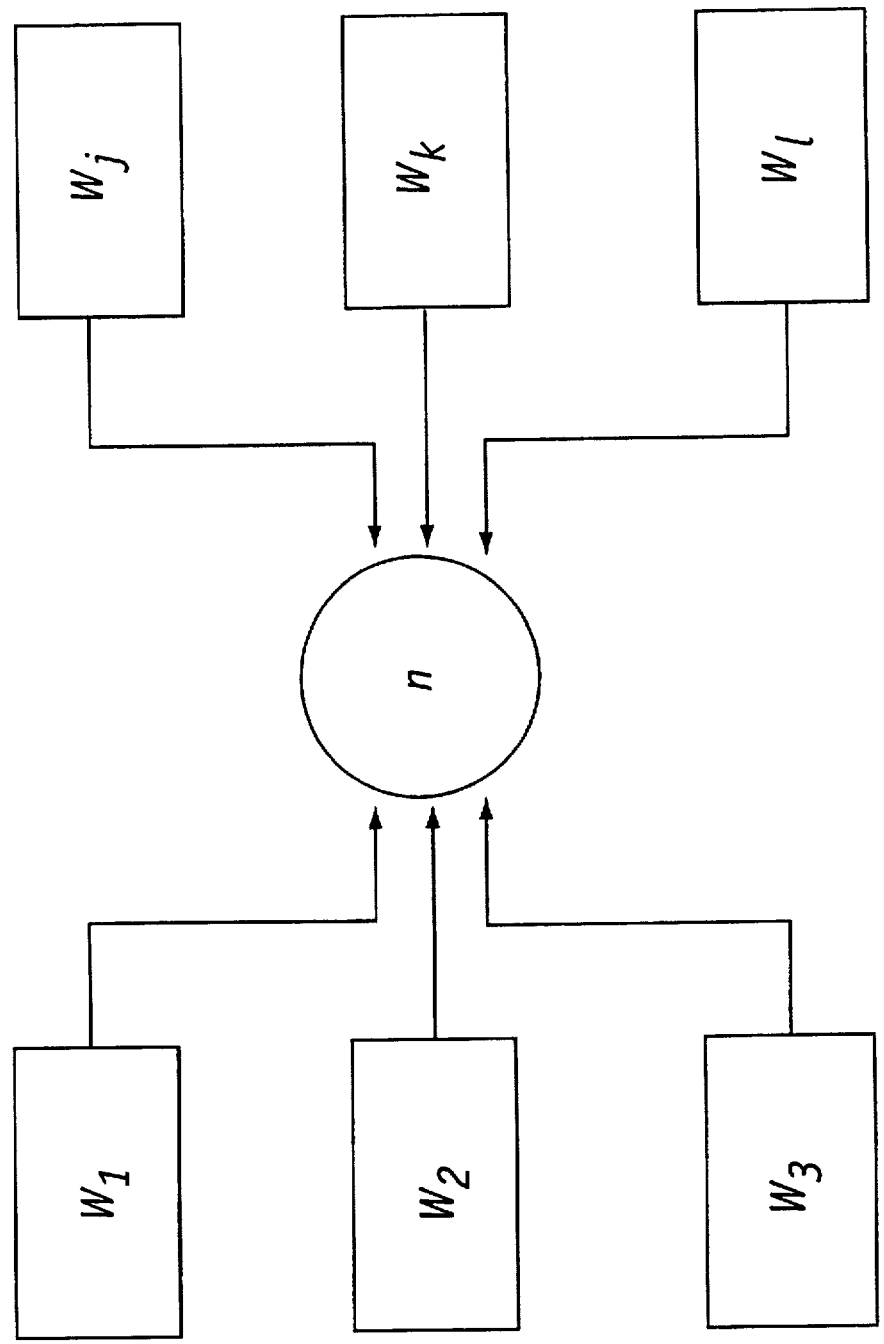
FIG. 15 is a diagram showing the improved lattice N-best technique.

FIG. 15 illustrates another, presently preferred, technique for performing the N-best hypotheses analysis. Referred to here as the lattice N-best technique, at each frame the procedure computes the likelihood for each grammar node and saves the best responses coming to that node. It then stores the probability along with the number of frames that hypothesis has been active. The technique thus retains N-best hypothesis and propagates the best one through the node, all others are subsumed by the maximum likelihood path.

The Viterbi forward algorithm computes the probability for each state. This is done frame-by-frame upon all data in the input buffer, with the probabilities being stored in a State data structure. The presently preferred lattice N-best technique is a modified Viterbi algorithm that produces the N-best candidates, but propagates in the next model only the maximum likelihood. Thus at each frame, the routine computes the likelihood for each grammar node and then saves the best responses coming into that node.

Referring to FIG. 15, a network node n is depicted. Three hypotheses $W_1$, $W_2$ and $W_3$ enter node n. Of these hypotheses only the maximum likelihood (highest probability) is carried forward. Thus node n generates the next word hypotheses $W_j$, $W_k$ and $W_l$, based on the maximum likelihood from node n. The Viterbi forward algorithm stores the probability, the duration (the number of frames that the current hypothesis has been active) and a pointer to each hypothesis that generated the particular network node. This information is used by the backtracking algorithm when the probability data in the State data structure is analyzed.

Figure 16:
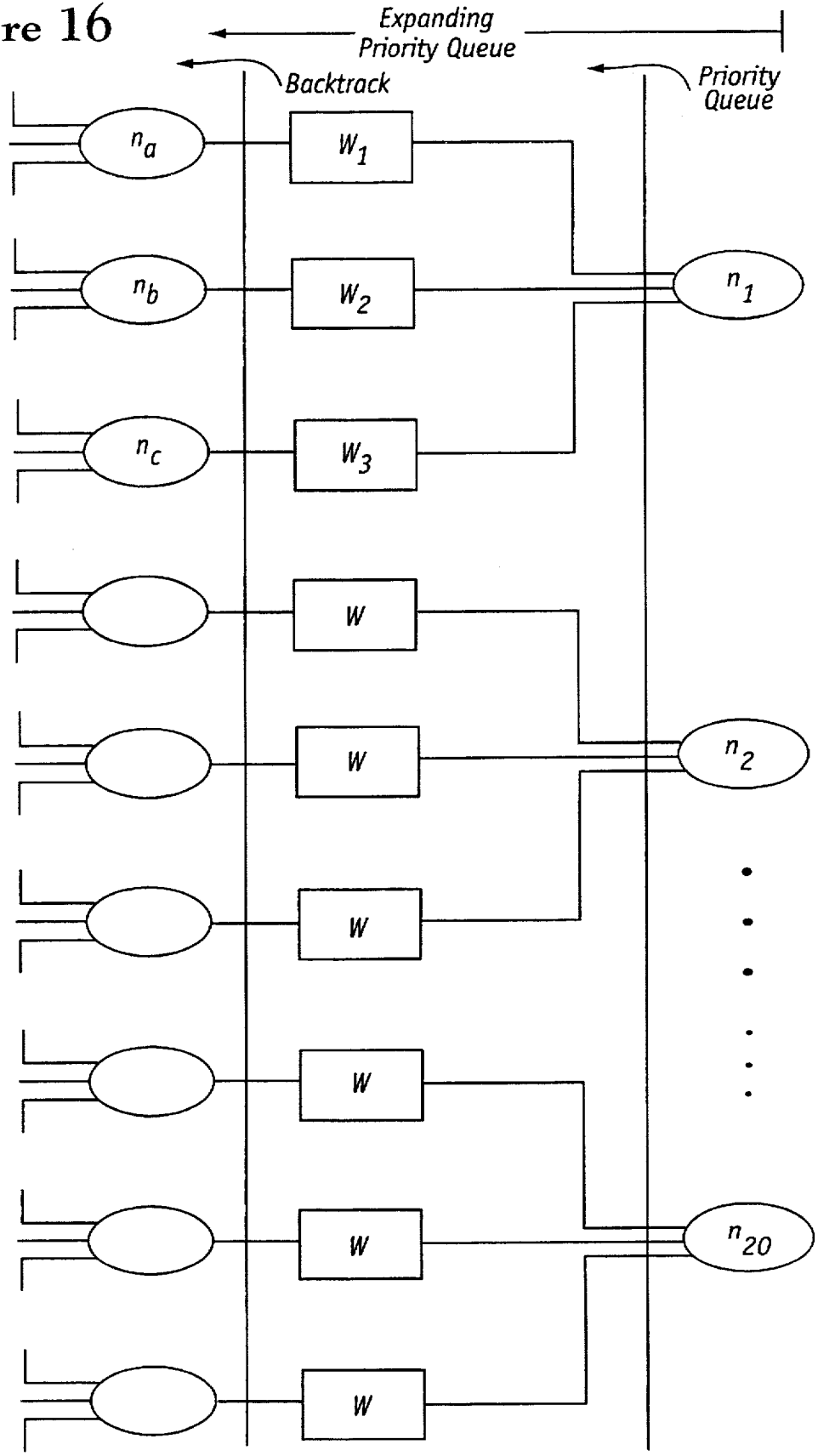
FIG. 16 is a diagram further describing how hypotheses generation is performed during the backtracking phase of recognition.

The backtracking algorithm may be understood with reference to FIG. 16. The presently preferred backtracking algorithm prioritizes all of the N-best ending nodes into a priority queue, illustrated in FIG. 16 as the vertical column 280. If, for example, during the first pass 20 hypotheses are propagated in the last frame (N=20), then there will be 20 ending nodes ($n_1$, $n_2$, ..., $n_{20}$) in priority queue 280. The ending nodes are sorted in descending order, such that the first ending node in the queue represents the one with the highest probability score.

In FIG. 16 assume for purposes of illustration that node $n_1$ is the node with the highest score. That node is expanded by backtracking one step to locate the hypothesis ($W_1$, $W_2$ or $W_3$) that generated the given node $n_l$. Identifying this hypothesis in turn allows the backtracking routine to identify the node that generated the identified hypothesis. In FIG. 16, if hypothesis $W_2$ was responsible for generating node $n_1$, then node $n_b$ is identified through backtracking. Node $n_b$ is then substituted for node $n_1$ in priority queue 280. After substitution, the priority queue is again sorted in descending order. If the newly substituted node $n_b$ happens to have the highest score, then it will occupy the place previously occupied by node $n_l$. Of course, it is also possible that one of the other nodes in the priority queue will have a higher score than the newly substituted node $n_b$. In this case the node with the highest score, and not the newly substituted node $n_b$, will be used in the next backtracking operation.

Backtracking proceeds in the manner described above until a starting node (a node corresponding to the first frame of speech) is encountered during backtracking. When a starting node is reached a hypothesis has been found. The backtracking algorithm saves each of the most likely hypotheses encountered as backtracking is performed. These hypotheses may be saved as a string that may be played back in reverse order to generate the most likely candidate names.

FIG. 16 has illustrated the general case where there are multiple N-best hypotheses (N=20). Thus FIG. 16 corresponds to the backtracking step performed at 264 in FIG. 4. The same backtracking procedure is followed in backtracking Step 270 of FIG. 4, although in this third pass there would be only one ending node, not 20. To further illustrate the priority queue backtracking procedure see the example presented in Appendix B. The example shows the backtracking procedure for the name "JONES."

From the foregoing it will now be appreciated that the call routing device of the invention is well adapted for plug-compatible connection to virtually any office telephone network or PBX system. The routing device employs a sophisticated speaker-independent, continuous speech recognition technique that allows an incoming caller to spell the desired recipient's name and the system will automatically determine the proper telephone extension for the intended recipient and cause the existing telephone network or PBX system to connect the incoming caller to the recipient's extension. The invention eliminates the need to communicate with the telephone network through cumbersome touch-tone commands, making the system well-suited for the visually impaired. The speech recognition technique is highly flexible; incoming callers may spell at their own natural speaking rate and the system will automatically prompt the user to confirm the name selection after the caller quits speaking. The system will automatically resume speech recognition if the incoming caller pauses briefly and then continues spelling. The multipass speech recognition procedure performs well even over noisy telephone channels. The procedure propagates the N-best hypotheses between passes and defers the more computationally costly procedures until the final pass, at which time the candidate list of possible names has been greatly reduced. As a consequence of the N-best, multipass recognition process, the invention can be implemented using low cost DSP circuitry.

While the invention has been described in its presently preferred form, it will be understood that certain modifications can be made without departing from the spirit of the appended claims. Thus, for example, different configurations may be envisioned to connect with different types of present-day and future telephone systems, including both analog systems and digital systems.

APPENDIX A

```
Speech was found
End of Speech at frame 286
    100000      2100000     c
   2100000      5200000     k
   5200000      8500000     o
   8500000     12600000     h
  12600000     17000000     a        [First Pass]
  17000000     20800000     h
  20800000     23300000     o
  23300000     27700000     n
Hypothesis number 1: ckohahon, Prob per frame = 27.441595
    100000      2100000     c
   2100000      5200000     k
   5200000      8500000     o
   8500000     12600000     h
  12600000     16900000     a
  16900000     20600000     s
  20600000     23300000     o
  23300000     27700000     n
```

APPENDIX A-continued

```
Hypothesis number 2: ckohason, Prob per frame = 27.433636
596 = size of PC_dict
candidate  1 of 10 = thomason    Score = 14
candidate  2 of 10 = thompson    Score = 22
candidate  3 of 10 = thomson     Score = 26
candidate  4 of 10 = thorson     Score = 26
candidate  5 of 10 = shoulson    Score = 27   [DP Alignment]
candidate  6 of 10 = davidson    Score = 28
candidate  7 of 10 = johnson     Score = 28
candidate  8 of 10 = dodson      Score = 30
candidate  9 of 10 = carlson     Score = 31
candidate 10 of 10 = knudson     Score = 31
****************************
       *** Final Decision ! ***
****************************
   900000     5300000      j
  5300000     8500000      o
  8500000    12600000      h
 12600000    16900000      n       [Costly-Constrained
 16900000    20600000      s        Pass]
 20600000    23300000      o
 23300000    27700000      n
Hypothesis number 1: Johnson,
***************************************************
Total time used for this sentence
   Speech length:      2.870 seconds
   Real time:          3.688 seconds
   User time:          1.833 seconds
   Syst time:          0.000 seconds
***************************************************
```

Appendix B

Example of Priority-Queue Backtrack Procedure for "JONES"

- Last Frame Number is 10; Three Hypothesis Nodes Saved

```
1. node 6 (s)        2. node 6 (r)         3. node 4 (d)
   prob 0.9             prob 0.8              prob 0.6
   duration 18          duration 20 frames    duration 12 frames
   frames               prev. node 3          prev. node 2
   prev. node 3         frame #100            frame #100
   frame #100
```

- Build Priority Queue: (Order of Decreasing Probability):

```
[ ⑥ "s", 100 ] → [ ⑥ "r", 100 ] → [ 4 "d", 100 ] → 0
```

- Expand Maximum Likelihood Node, Extending Sequence Backward:

```
[ ⑥ "s", 100 ] -------> node 3 (e)
                         prob. 0.9 (prob. of parent)
                         duration 10
                         prev. node 1
                         frame: 100 - 18 = 82

-------> node 2 (a)
                         prob. 0.7 prob. of parent (0.9)
                         duration 10
                         prev. node 8
                         frame: 100 - 18 = 82
```

- Insert New Hypothesis Node in Priority Queue:

```
[ ③ "es", 82 ] → [ 6 "r", 100 ] → [ 2 "as", 82 ] → [ 4 "d", 100 ]
```

(Children Replace Parent Node in Queue)
Begin Procedure BackTrack
{ Initialize backtrack priority-queue Q }
For each grammar-terminal state S
Begin
    If S has active list h1,h2, . . . ,hn of hypotheses in final frame T
    Begin

Appendix B-continued

Example of Priority-Queue Backtrack Procedure for "JONES"

```
        For each active hypothesis h
        Begin
                generate node N
                N.score <- h.score
                N.sequence <- h.symbol
                N.duration <- h.duration
                N.predecessor <- h.predecessor
                N.time <- T
                enqueue N in Q
        End For
    End If
End For
{ Process priority-queue Q, generating
    n-best sequences. }
NumSequences <- 0
While Queue nonempty and NumSequences < n
Begin
    Dequeue first (top-scoring) node N from Q
    If N's predecessor is grammar-initial state
    Begin
        send N.sequence to output
        NumSequences <- NumSequences + 1
    End If
    { Expand N to generate child nodes.
        Add child nodes to priority queue Q }
    T <- N.time - N.duration
    S <- N.predecessor
    For each active hypothesis h for state S in frame T
    Begin
        generate node C
        C.score <- N.score - (best score for S in frame T - h.score)
        C.sequence <- concatenation of h.symbol and N.sequence
        C.duration <- h.duration
        C.predecessor <- h.predecessor
        C.time <- T
        enqueue C in Q
    End For
End While
End Procedure BackTrack
```

What is claimed is:

1. A speech recognition telephone call routing apparatus for a telephone switching network of the type that connects an incoming caller to a selected one of a plurality of extensions associated with a plurality of respective names, comprising:

an input/output port having at least one audio channel for connecting to said switching network to support voiced communication with an incoming caller, and at least one control channel for connecting to said switching network to supply switching instructions to said network;

a speech processor coupled to said audio channel for prompting an incoming caller to spell the name of an intended call recipient, said speech processor including a speech recognizer for analyzing a voiced spelled name provided by said incoming caller in response to said prompt and for selecting a name candidate corresponding to the spelled name; and switching logic coupled to said speech recognizer and to said control channel for issuing switching instructions to said switching network to cause said switching network to connect the incoming caller to a selected one of said plurality of extensions corresponding to said selected name candidate, wherein said speech processor comprises a multipass speech recognition processor including a first pass employing Hidden Markov Models for representing letters used in the representation of spelled names and a second pass employing dynamic programming comparison with a database of spelled names.

2. The apparatus of claim 1 wherein said multipass speech recognition processor further includes a third pass employing Hidden Markov Models for representing a subset of said plurality of names, the subset being selected by operation of said first and second passes.

3. A speech recognition telephone call routing apparatus for a telephone switching network of the type that connects an incoming caller to a selected one of a plurality of extensions associated with a plurality of respective names, comprising:

an input/output port having at least one audio channel for connecting to said switching network to support voiced communication with an incoming caller, and at least one control channel for connecting to said switching network to supply switching instructions to said network;

speech processor coupled to said audio channel for prompting an incoming caller to spell the name of an intended call recipient, said speech processor including a speech recognizer for analyzing a voiced spelled name provided by said incoming caller in response to said prompt and for selecting a name candidate corresponding to the spelled name; and switching logic coupled to said speech recognizer and to said control channel for issuing switching instructions to said switching network to cause said switching network to connect the incoming caller to a selected one of said plurality of extensions corresponding to said selected name candidate, wherein said speech processor comprises a speech recognition module for performing a Viterbi forward process on said voiced spelled name to generate a set of state data and a backtracking process on said set of state data to identify at least one name candidate.

4. A speech recognition telephone call routing apparatus for a telephone switching network of the type that connects an incoming caller to a selected one of a plurality of extensions associated with a plurality of respective names, comprising:

an input/output port having at least one audio channel for connecting to said switching network to support voiced communication with an incoming caller, and at least one control channel for connecting to said switching network to supply switching instructions to said network;

a speech processor coupled to said audio channel for prompting an incoming caller to spell the name of an intended call recipient, said speech processor including a speech recognizer for analyzing a voiced spelled name provided by said incoming caller in response to said prompt and for selecting a name candidate corresponding to the spelled name; and switching logic coupled to said speech recognizer and to said control channel for issuing switching instructions to said switching network to cause said switching network to connect the incoming caller to a selected one of said plurality of extensions corresponding to said selected name candidate, wherein said speech processor segments said voiced spelled name into time frames and generates the N-best hypotheses, wherein N is a predetermined integer number.

5. The apparatus of claim 4 wherein said speech processor stores the N-best hypotheses for each frame as grammar nodes, propagating the maximum likelihood candidates to the succeeding node.

6. A speech recognition telephone call routing apparatus for a telephone switching network of the type that connects an incoming caller to a selected one of a plurality of extensions associated with a plurality of respective names, comprising:

an input/output port having at least one audio channel for connecting to said switching network to support voiced communication with an incoming caller, and at least one control channel for connecting to said switching network to supply switching instructions to said network;

a speech processor coupled to said audio channel for prompting an incoming caller to spell the name of an intended call recipient, said speech processor including a speech recognizer for analyzing a voiced spelled name provided by said incoming caller in response to said prompt and for selecting a name candidate corresponding to the spelled name; and switching logic coupled to said speech recognizer and to said control channel for issuing switching instructions to said switching network to cause said switching network to connect the incoming caller to a selected one of said plurality of extensions corresponding to said selected name candidate, wherein said speech processor includes:
  a voice activation detection module for detecting the beginning and ending of a speech provided by the incoming caller as audible information over the audio channel; and
  a decoder module communicating with said voice activation detection module for selecting a name candidate through speech recognition of the audible information,
  said decoder module performing speech recognition in response to detection of the ending of speech.

7. The apparatus of claim 6 wherein said voice activation detection module detects the ending of speech by detecting a pause in audible information over the audio channel following the detection of the beginning of speech.

8. The apparatus of claim 7 wherein said decoder module includes a pause evaluation system for resuming speech recognition in response to detection that the incoming caller has resumed speaking after said ending of speech is detected.

9. A speech recognition telephone call routing apparatus for a telephone switching network of the type that connects an incoming caller to a selected one of a plurality of extensions associated with a plurality of respective names, comprising:

an input/output port having at least one audio channel for connecting to said switching network to support voiced communication with an incoming caller, and at least one control channel for connecting to said switching network to supply switching instructions to said network;

a speech processor coupled to said audio channel for prompting an incoming caller to spell the name of an intended call recipient, said speech processor including a speech recognizer for analyzing a voiced spelled name provided by said incoming caller in response to said prompt and for selecting a name candidate corresponding to the spelled name; and switching logic coupled to said speech recognizer and to said control channel for issuing switching instructions to said switching network to cause said switching network to connect the incoming caller to a selected one of said plurality of extensions corresponding to said selected name candidate, wherein said speech processor includes an input buffer coupled to said audio channel for receiving and temporarily storing audible information provided as speech by the incoming caller; and wherein said speech processor includes a voice activation detection module for monitoring said audio channel to detect the beginning and ending of speech and for copying said audible information to said input buffer.

10. A speech recognition telephone call routing apparatus for a telephone switching network of the type that connects an incoming caller to a selected one of a plurality of extensions associated with a plurality of respective names, comprising:

an input/output port having at least one audio channel for connecting to said switching network to support voiced communication with an incoming caller, and at least one control channel for connecting to said switching network to supply switching instructions to said network;

a speech processor coupled to said audio channel for prompting an incoming caller to spell the name of an intended call recipient, said speech processor including a speech recognizer for analyzing a voiced spelled name provided by said incoming caller in response to said prompt and for selecting a name candidate corresponding to the spelled name; and switching logic coupled to said speech recognizer and to said control channel for issuing switching instructions to said switching network to cause said switching network to connect the incoming caller to a selected one of said plurality of extensions corresponding to said selected name candidate, wherein said speech processor includes a decoder module that analyzes the voiced spelled name response provided by the incoming caller by;

performing Viterbi analysis on said response and storing a set of hypotheses and probabilities corresponding to the voiced spelled name response until an end-of-speech is detected;

performing backtracking analysis on said set of hypotheses, aligning the hypotheses data with a prestored dictionary representing said plurality of respective names and extensions to create at least one string of characters corresponding to a hypothesis for the voiced spelled name response;

testing the length of silence following the end-of-speech and, based on the length of silence:
  a) outputting said string of characters as the selected name candidate if the length of silence is above a predetermined duration, and
  b) performing further Viterbi analysis and backtracking analysis if the length of silence is below a predetermined duration.

* * * * *